United States Patent
Wilke

[11] 3,875,667
[45] Apr. 8, 1975

[54] IN-LINE STRAIGHTNESS SENSING DEVICE
[75] Inventor: David J. Wilke, York, Pa.
[73] Assignee: Handy & Herman Specialty Metals Group, Cockeysville, Md.
[22] Filed: Nov. 21, 1973
[21] Appl. No.: 417,794

[52] U.S. Cl. .......... 33/174 L; 33/174 P; 33/174 Q; 33/DIG. 5
[51] Int. Cl. ............................................. G01b 5/20
[58] Field of Search .......... 33/174 L, 174 Q, 178 E, 33/DIG. 5, 143 L, 147 L, 172 E, 172 R, 174 P; 324/34 P, 34 TK, 34 E; 226/100

[56] References Cited
UNITED STATES PATENTS
2,789,693  4/1957  Harder ............................ 33/174 L

*Primary Examiner*—Richard E. Aegerter
*Assistant Examiner*—Willis Little
*Attorney, Agent, or Firm*—Brady, O'Boyle & Gates

[57] ABSTRACT

A device for sensing the straightness of a running length of rod or wire wherein a pair of sensors are disposed perpendicularly to each other adjacent the rod whereby deviations along the X—X and Y—Y axes of the rod are sensed, the sensors being connected to a readout device for displaying the sensed deviations.

7 Claims, 5 Drawing Figures

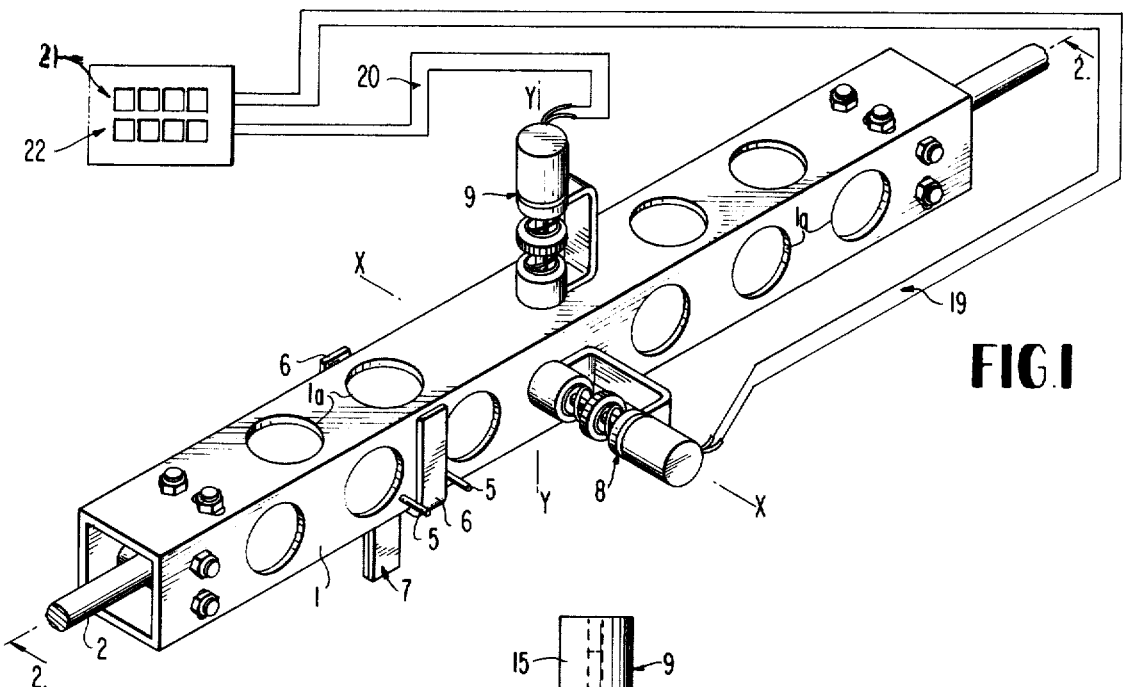
FIG.1
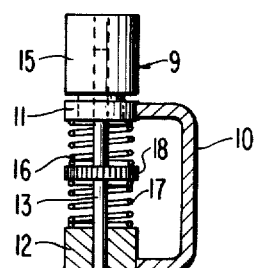
FIG.2
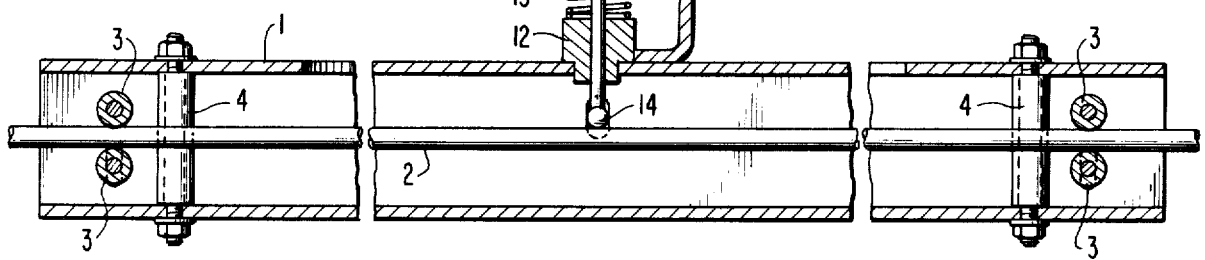
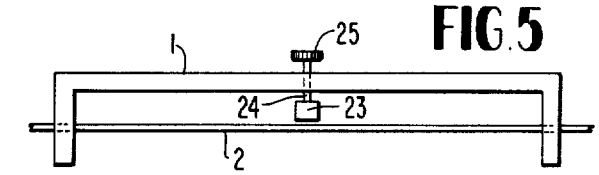
FIG.5
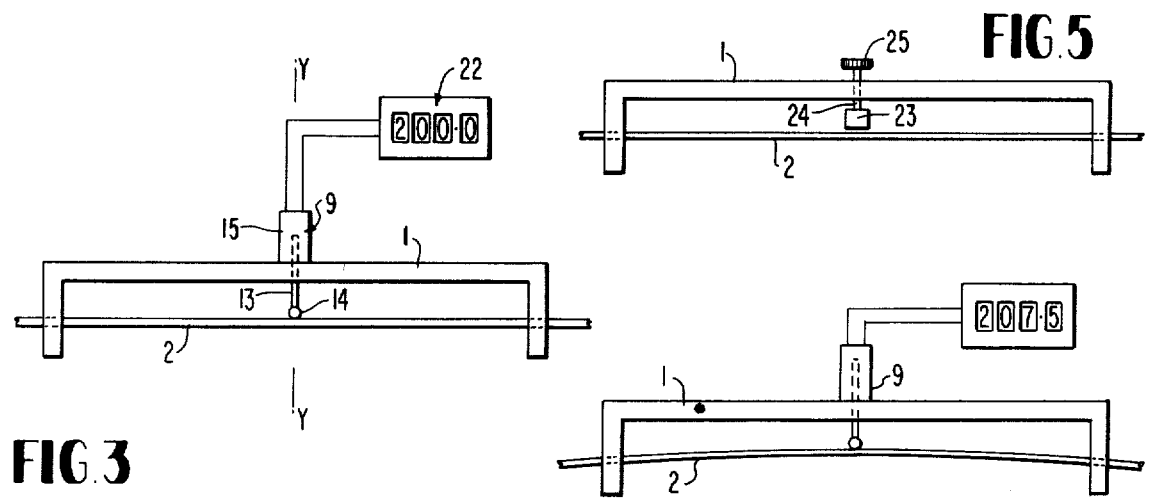
FIG.3
FIG.4

IN-LINE STRAIGHTNESS SENSING DEVICE

BACKGROUND OF THE INVENTION

Heretofore the conventional way for a machine operator to determine the straightness of a given length of wire or rod which has been drawn, straightened and cut is to visually observe the degree of straightness by rolling the finished cut length of rod on a flat surface, or by holding the rod outwardly and sighting along the surface thereof while rotating the rod. If the rod is not straight, the operator adjusts the rolls or dies in a conventional straightening machine; starts the machine; cuts a few lengths; stops the straightening machine and once again visually checks the straightness of the rods. This conventional trial and error method employed by the operator for determining when his die adjustments do in fact produce a straight cut length of wire or rod is wasteful both in time and product.

To overcome the disadvantages experienced heretofore in determining the straightness of a cut length of wire or rod, the device of the present invention has been devised which is adapted to be positioned adjacent the output end of a conventional wire or rod straightening machine, the device including a pair of sensors disposed perpendicularly to each other adjacent the running length of rod whereby deviations along the X—X axis and Y—Y axis of the rod are sensed. The sensors are connected to a readout device displaying the respective sensed deviations so that the operator may make the proper adjustments to the straightening machine.

IN THE DRAWINGS

FIG. 1 is a perspective view of the sensing device of the present invention;

FIG. 2 is a fragmentary, sectional view taken along line 2—2 of FIG. 1 illustrating a contact type sensor;

FIG. 3 is a diagrammatic view showing the structural relationship of the sensing device and the readout device when a straight wire or rod is run through the device;

FIG. 4 is a diagrammatic view of the device illustrating a deviation along the Y—Y axis of the rod and the subsequent display thereof in the readout device; and FIG. 5 is a diagrammatic view similar to FIG. 3 but showing the use of the non-contact type sensor in lieu of the contact type sensors shown in FIGS. 1 to 4.

Referring to the drawings and more particularly to FIGS. 1 and 2 thereof, the in-line straightness sensing device of the present invention comprises a tubular housing 1 supported on the running length of wire or rod 2 by horizontally disposed idler rollers or bearings 3, and vertically disposed idler rollers 4 mounted at each end of the housing. The housing is provided with a plurality of apertures 1a to reduce the weight of the housing, and a pair of pins 5 extend outwardly from each side wall of the housing and straddle the arms 6 of a fixed bifurcated bracket 7 to thereby prevent the housing from traveling with the running length of wire.

A pair of sensors 8 and 9 are mounted on the side and top walls, respectively, of the housing, substantially intermediate the ends of the housing, and disposed perpendicular to each other whereby deviations along the X—X and Y—Y axes of the rod can be sensed, to be described more fully hereinafter. The sensors illustrated in FIG. 1 are a contact-type, the details of which are illustrated in FIG. 2, it being understood that sensor 8 is identical to sensor 9. Each sensor comprises a U-shaped bracket 10 having bushings 11 and 12 provided on each arm thereof through which a rod 13 is slidably mounted. The lower end of the rod is provided with a transversely extending pin 14 which contacts the surface of the running length of wire 2. The opposite end of rod 13 is slidably mounted in a low voltage detection transformer 15 mounted on the bushing 11, the rod thus forming a slidable core for the transformer. Rod 13 also extends through a pair of coil springs 16 and 17 biased, respectively, between one face of a thumb wheel 18 and the bushing 11, and the opposite face of the thumb wheel and bushing 12. As will be seen in FIG. 1, the transformer of each sensor 8 and 9 is connected to a respective readout circuit 19 and 20 which in turn are connected to respective digital displays 21 and 22.

To calibrate the device of the present invention, a cut length of rod known to be straight and having the same diameter as the rod to be run is inserted into the housing 1 so that the housing is supported thereon by the bearings 3 and 4 at each end of the housing. The pins 14, engaging the surface of the rod 2 along the X—X and Y—Y axes thereof, slide the respective rods 13 in the transformers 15, the inductance in the cores is sensed by each readout circuitry 19 and 20 and applied to the respective digital displays 21 and 22 to give an initial reading along the X—X axis and Y—Y axis, such as 200.0, as shown in FIG. 3. The device is now calibrated and the rod is removed therefrom. The device is then placed adjacent the output of a conventional wire straightening machine (not shown) and the wire or rod is fed therefrom into the housing 1 so that the housing 1 and associated sensors 8 and 9 are supported on the running length of rod 2 as described hereinabove. As the rod 2 runs through the housing any deviation along the X—X and Y—Y axes of the rod will be detected by sensors 8 and 9, respectively, and displayed at 21 and 22. The machine operator noting the deviation display, as shown in FIG. 4, will make the necessary adjustments in the wire straightening machine until the digital readout indicates 200.0.

While the sensors 8 and 9 have been described as contact-type, that is, they contact the running length of wire; in some instances, where it is desirable that the running length of wire not be contacted by the sensors, non-contact sensors, such as eddy-current proximity transducers, can be employed. Such an arrangement is illustrated in FIG. 5 wherein the sensing probe 23 is secured to the lower end of a stem 24 threadably mounted in the wall of the housing 1, the proximity of the probe 23 to the rod 2 being adjusted by turning the knurled knob 25 on the end of the stem.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A device for determining the straightness of a running length of wire or rod comprising, housing means through which the wire is adapted to be run, wire support means mounted on said housing means for freely supporting said housing means on the running length of wire, a pair of sensor means mounted on said housing means, said sensor means being disposed perpendicular to each other and to the longitudinal axis of said wire, one sensor means adapted to detect deviations along the X—X axis of the running length of wire, said X—X axis being in a horizontal plane and perpendicular to the longitudinal axis of said wire; the other sensor adapted to detect deviations along the Y—Y axis of the running length of wire, said Y—Y axis being in a vertical plane and perpendicular to the longitudinal axis of said wire, and respective display means connected to each sensor means for displaying the detected deviation.

2. A device according to claim 1, wherein said housing means comprises, an elongated tubular housing wherein the wire support means are mounted at each end of said housing.

3. A device according to claim 1, wherein stop means are operatively connected to the housing means to prevent the housing means from traveling with the running length of wire.

4. A device according to claim 2, wherein the rod support means comprises a pair of spaced, horizontally disposed rollers and a pair of spaced, vertically disposed rollers mounted at each end of said housing, said wire extending through space between each pair of rollers.

5. A device according to claim 2, wherein said pair of sensor means are positioned on said housing substantially intermediate the ends thereof.

6. A device according to claim 1, wherein each sensor means comprises a rod extending through and slidably mounted in a wall of said housing means, a pin connected to one end of said rod and adapted to contact the surface of said running length of wire, a transformer positioned in proximity to the opposite end of said rod, the opposite end of said rod slidably mounted in said transformer thereby providing a slidable core therefor.

7. A device according to claim 1, wherein each sensor means comprises an eddy-current proximity transducer having a sensing probe secured to the end of an adjustable stem extending through a wall of said housing means.

* * * * *